(12) United States Patent
Bu et al.

(10) Patent No.: US 11,840,133 B2
(45) Date of Patent: Dec. 12, 2023

(54) TORSION SPRING INSTALLATION MEANS FOR VEHICLE SUNROOF, FRONT FRAME AND VEHICLE SUNROOF

(71) Applicant: Webasto SE, Stockdorf (DE)

(72) Inventors: Yunquan Bu, Shanghai (CN); Baojia Liu, Shanghai (CN); Jun Chen, Shanghai (CN)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/544,489

(22) Filed: Dec. 7, 2021

(65) Prior Publication Data

US 2022/0185083 A1 Jun. 16, 2022

(30) Foreign Application Priority Data

Dec. 11, 2020 (CN) .......................... 202022969334.3

(51) Int. Cl.
*B60J 7/22* (2006.01)
*B60J 7/02* (2006.01)
(Continued)

(52) U.S. Cl.
CPC ................. *B60J 7/22* (2013.01); *B60J 7/022* (2013.01); *F16F 1/16* (2013.01); *B60J 7/043* (2013.01)

(58) Field of Classification Search
CPC ..... B60J 7/22; B60J 7/022; B60J 7/023; B60J 7/02; B60J 7/043; B60J 7/0435;
(Continued)

(56) References Cited

U.S. PATENT DOCUMENTS

| 9,873,314 B1 * | 1/2018 | Grimaldo | ................... B60J 7/22 |
| 2015/0273991 A1 * | 10/2015 | Kokubo | ...................... B60J 7/22 |
| | | | 296/217 |
| 2017/0100995 A1 * | 4/2017 | Konishi | .................... B60J 7/22 |

FOREIGN PATENT DOCUMENTS

| CN | 106808986 A | 6/2017 |
| CN | 207190763 U | 4/2018 |

(Continued)

OTHER PUBLICATIONS

EPO Extended European Search Report dated Apr. 28, 2022; (8 pages in English).

*Primary Examiner* — Amy R Weisberg
*Assistant Examiner* — Joyce Eileen Hill
(74) *Attorney, Agent, or Firm* — Fitch, Even, Tabin & Flannery, LLP

(57) ABSTRACT

A torsion spring installation means for a vehicle sunroof, front frame and vehicle sunroof. The torsion spring may have spring coils, a first torsion arm and a second torsion arm. The torsion spring installation means has a recess, the recess being configured as a cavity having an opening, for the purpose of receiving the spring coils, and having a wall and a recess bottom; a receiving component, the receiving component having an opening part, in order to receive the first torsion arm; wherein a guide block is provided on a first wall face of the wall in a fixed manner, the guide block extending out from the first wall face in such a way that its size gradually diminishes. The present means provides convenience of installation and removal, ease of maintenance and replacement, effective prevention of water penetration, the ability to prevent jumping out and wobbling, an extended service life.

14 Claims, 6 Drawing Sheets

(51) Int. Cl.
*B60J 7/043* (2006.01)
*F16F 1/16* (2006.01)

(58) Field of Classification Search
CPC ....... B60J 7/20; F16F 1/14; E05F 3/20; B62D 37/00; B62D 37/02
USPC .............................................. 296/217, 180.1
See application file for complete search history.

(56) References Cited

FOREIGN PATENT DOCUMENTS

EP          2505400 A2 * 10/2012  ................ B60J 7/22
JP          S62122728 U    8/1987

* cited by examiner

A-A

B-B

TORSION SPRING INSTALLATION MEANS FOR VEHICLE SUNROOF, FRONT FRAME AND VEHICLE SUNROOF

CROSS-REFERENCE TO RELATED APPLICATION

This application claims priority from Chinese Patent Application Number CN 202022969334.3, filed Dec. 11, 2020, which is hereby incorporated herein by reference in its entirety for all purposes.

TECHNICAL FIELD

The present utility model relates to the technical field of vehicle sunroof components. In particular, it relates to a torsion spring installation means for a vehicle sunroof, and further relates to a front frame and a vehicle sunroof.

BACKGROUND ART

Wind-blocking mesh assemblies are provided on vehicle sunroofs for the purpose of deflecting airflow and reducing wind noise. As a moveable sunroof glass assembly gradually opens, the wind-blocking mesh assembly lifts up and opens; as the sunroof glass assembly closes, the wind-blocking mesh assembly is pressed down and stowed. As the wind-blocking mesh assembly lifts up and is pressed down, a torsion spring provides an action force and a reaction force, wherein two torsion arms and spring coils of the torsion spring are correspondingly connected to the wind-blocking mesh assembly and a torsion spring installation means located on a front frame of the vehicle sunroof.

Numerous functional components need to installed in a coordinated fashion on the front frame of the vehicle sunroof, and the structural features thereof are complex and crowded together. As one of these, the torsion spring installation means not only needs to balance the effective implementation of the respective functions of various structures therein, but also needs to be arranged in a simple, effective and rational way; at the same time, it is necessary to take into account the arrangement of structures adjacent thereto, and in particular, it is necessary to comprehensively pay attention to factors such as the function of preventing water penetration, whether the arrangement is simple, whether installation is convenient and quick, and cost control. A comprehensive, simple and effective technical solution thus appears to be highly important.

In the related art, if a hole is provided in a horizontal direction to fix one of the torsion arms of the torsion spring, this easily results in water penetration; moreover, the compact structure of the torsion spring installation means makes it difficult to install the torsion spring in the hole running in the horizontal direction. If a hole is provided in a vertical direction or another direction to fix the torsion arm, jolting in extreme road conditions will result in excessive springing of the torsion spring, and may even cause the torsion spring to jump out of the torsion spring installation means. If a complex structure is provided to limit the extent of wobbling and/or springing of the spring coils, then the arrangement will be complicated, making installation and cost control difficult, and furthermore, the arrangement of other adjacent structures is likely to be affected, i.e. paying attention to one aspect is likely to be detrimental to another. If the torsion spring installation means has too compact a configuration, interference and other factors will result in abnormal noises and wear to the spring coils, or will make installation difficult. In addition, dismantling is inconvenient, making maintenance and replacement difficult, etc.

SUMMARY OF THE PRESENT UTILITY MODEL

To solve the abovementioned problem, the present utility model provides a torsion spring installation means for a vehicle sunroof. In addition, the present utility model also provides a front frame comprising the torsion spring installation means for a vehicle sunroof, and a vehicle sunroof.

For this purpose, a first aspect of the present utility model provides a torsion spring installation means for a vehicle sunroof, configured to have a torsion spring fixed therein, the torsion spring comprising: spring coils, a first torsion arm and a second torsion arm, wherein the torsion spring installation means comprises: a recess, the recess being configured as a cavity having an opening, for the purpose of receiving the spring coils, and having a wall and a recess bottom; a receiving component, the receiving component having an opening part, in order to receive the first torsion arm; wherein a guide block is provided on a first wall face of the wall in a fixed manner, the guide block extending out from the first wall face in such a way that its size gradually diminishes.

Optionally, a free end of the guide block forms a sloping face in a direction away from the opening.

Optionally, the recess bottom comprises: a depressed face matched to the shape of an outer surface of the spring coils.

Optionally, the maximum length by which the guide block extends out from the first wall face is set at two to four times a spring coil compression distance of the spring coils.

Optionally, at least a bottom face of the guide block is configured to have a shape matched to a partial inner surface of the spring coils.

Optionally, the recess further comprises: a limiting block, the limiting block being provided on a second wall face in a fixed manner, and a first gap being left between the limiting block and an outer surface of the spring coils, for the purpose of limiting the extent of wobbling of the spring coils.

Optionally, the limiting block does not interfere with the first torsion arm and/or the second torsion arm.

Optionally, a free end of the limiting block is configured to have a shape matched to a partial outer surface of the spring coils.

Optionally, the second wall face is configured so as not to interfere with the second arm when the second arm is in a position in which it is located when not acted on by an external force.

Optionally, the height of the second wall face is configured to be no lower than the height of the geometric centre or centre of gravity of the spring coils.

Optionally, the receiving component further comprises: a cavity arranged in an oblique direction, the cavity receiving the first torsion arm via the opening part.

Optionally, the receiving component further comprises: at least one first contact face that limits a first horizontal direction, and/or at least one second contact face that limits a first perpendicular direction.

A second aspect of the present utility model provides a front frame for a vehicle sunroof, wherein the front frame comprises the torsion spring installation means for a vehicle sunroof as described above.

Optionally, the torsion spring installation means for a vehicle sunroof is provided on the front frame in a fixed manner or is integrally formed on the front frame.

A third aspect of the present utility model provides a vehicle sunroof, comprising: a torsion spring, a wind-blocking mesh assembly; and the torsion spring installation means for a vehicle sunroof as described above or the front frame for a vehicle sunroof as described above; the torsion spring being fixed and connected to the wind-blocking mesh assembly via the torsion spring installation means, for the purpose of providing an action force or a reaction force for the wind-blocking mesh assembly.

Optionally, the first torsion arm comprises: at least one first extension part constrained in a first horizontal direction, and/or at least one second extension part constrained in a first perpendicular direction.

The torsion spring installation means for a vehicle sunroof according to the present utility model has numerous advantages, such as convenience of installation and removal, ease of maintenance and replacement, a rational and simple structure, effective prevention of water penetration, the ability to prevent the torsion spring from springing to a high degree, jumping out and wobbling, an extended torsion spring service life, and a low cost.

BRIEF DESCRIPTION OF THE DRAWINGS

Drawings of exemplary embodiments of the present utility model are shown below as examples. Identical or similar reference signs are used in the drawings to indicate identical or similar elements. In the drawings.

DETAILED DESCRIPTION OF THE UTILITY MODEL

In the present utility model, the wording "and/or" is intended to cover all possible combinations and sub-combinations of the listed elements, including any one, any sub-combination or all of the individually listed elements, not necessarily excluding other elements.

In the present utility model, unless otherwise stated, the use of the words "first", "second", etc. to describe various elements is not intended to define the relationship of these elements in terms of position, time sequence or importance; such words are merely used to distinguish one element from another.

In the present utility model, a first horizontal direction means a horizontal direction pointing towards a first contact face; a first perpendicular direction means a direction that is perpendicular to a horizontal direction and points towards a second contact face; and an oblique direction means a direction that forms any acute or obtuse angle with the first horizontal direction.

Torsion springs include but are not limited to: single torsion springs, double torsion springs, flat wire torsion springs and specially-shaped torsion springs, wherein double torsion springs are further divided into outer double torsion springs and inner double torsion springs. Adjacent individual coils of the torsion spring can be coiled close together or coiled so as to be separated from one another, i.e. the spring coils are tightly coiled or loosely coiled. The extremities of the torsion spring can be configured as two torsion arms or various torsion arm variants. In the present utility model, unless otherwise stated, "torsion spring" generally means a tightly coiled torsion spring with gaps between adjacent individual coils.

In the present utility model, the minimum axial length of the spring coils is the axial length of the spring coils when squeezed to the limit in the axial direction. In the case of loosely coiled torsion springs and tightly coiled torsion springs with gaps between the individual coils, squeezing to the limit means that all of the gaps between the individual coils are completely squeezed and disappear, at which time the spring coils cannot be squeezed any more to a shorter length in the axial direction.

In the present utility model, the spring coil compression distance is the distance by which the spring coils are shortened when squeezed to the limit in the axial direction in a natural state. The spring coil compression distance is related to the number of spring coils, the gap between adjacent individual coils, and the intrinsic attributes of the spring coils themselves, etc.

In a vehicle sunroof, the spring coils and one of the torsion arms of the torsion spring are limited by means of a torsion spring installation means arranged at two sides of a U-shaped front frame. As the wind-blocking mesh assembly lifts up and is pressed down, a torsion spring provides an action force and a reaction force.

Figure 1:
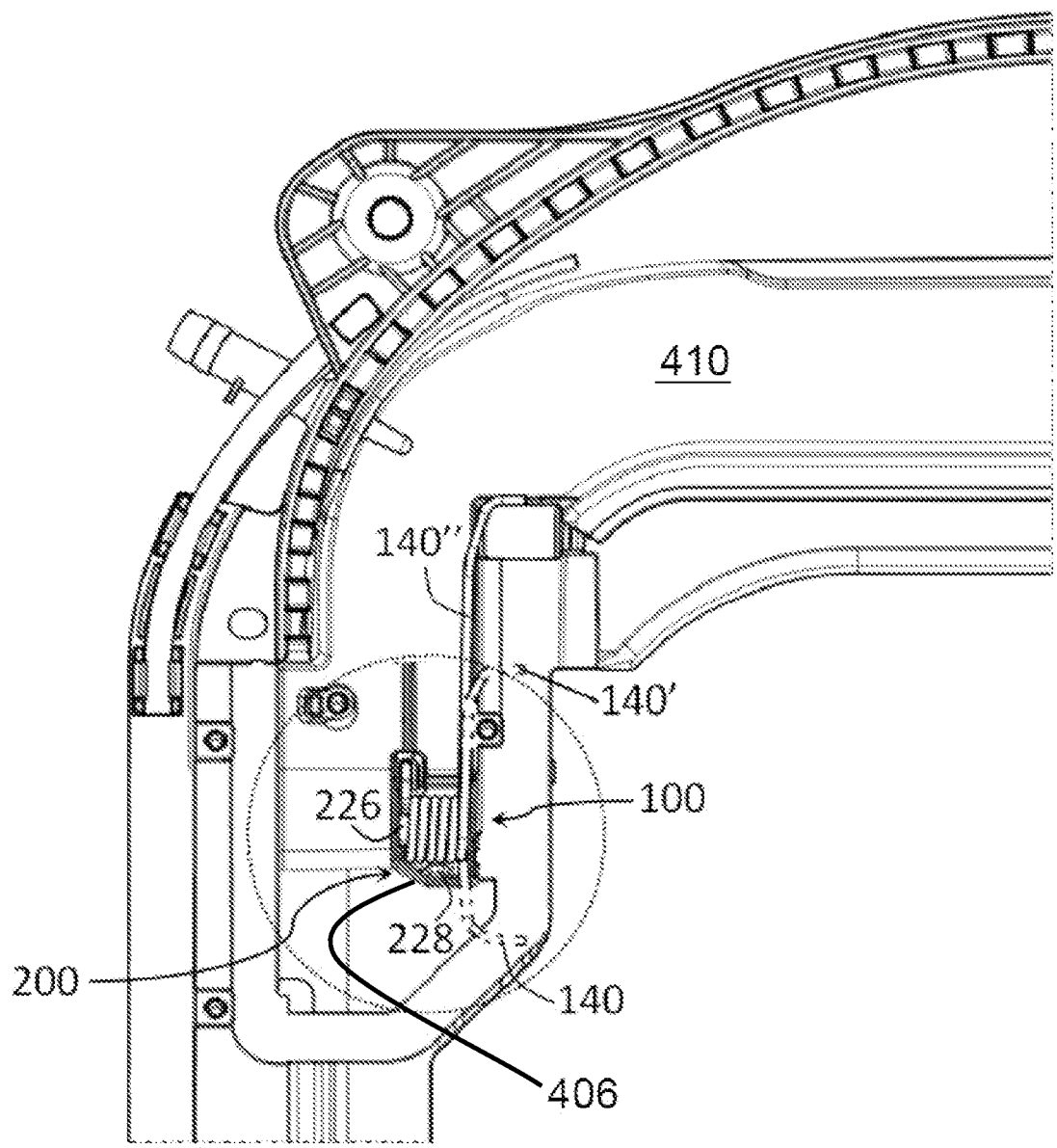
FIG. 1 shows a partial schematic drawing of a front frame fitted with a torsion spring installation means for a vehicle sunroof and a torsion spring in an exemplary embodiment of the present utility model.

FIG. 1 shows a partial schematic diagram of a front frame 410 for a vehicle sunroof according to the present utility model, comprising a torsion spring installation means 200 for the vehicle sunroof and a torsion spring 100. The structural features on the front frame 410 are complex and crowded together, so for convenience of reading, some of the structural features of the front frame 410 are omitted in FIG. 1; the omitted parts do not influence the performance of the functions of the relevant characteristic parts. FIG. 1 only shows the torsion spring installation means and torsion spring at the driver's seat side. In general, the front frame 410 comprises two structurally symmetric torsion spring installation means, and it should be understood that the torsion spring installation means at the front passenger seat side has a similar structure to that of the torsion spring installation means at the driver's seat side.

FIGS. 1 to 8 show the torsion spring installation means 200 for a vehicle sunroof, wherein the torsion spring 100 comprises spring coils 160, a first torsion arm 120 and a second torsion arm 140; a recess 220, the recess 220 being configured to receive the spring coils 160, and being configured as a cavity 406 with an opening, said cavity 406 being formed by a recess bottom 224 and a wall 221; a receiving component 240, the receiving component 240 having an opening part 242, and receiving the first torsion arm 120; wherein a guide block 226 is provided on a first wall face 222 of the wall 221 in a fixed manner, the guide block 226 extending out from the first wall face 222 in such a way that its size gradually diminishes.

Figure 4:
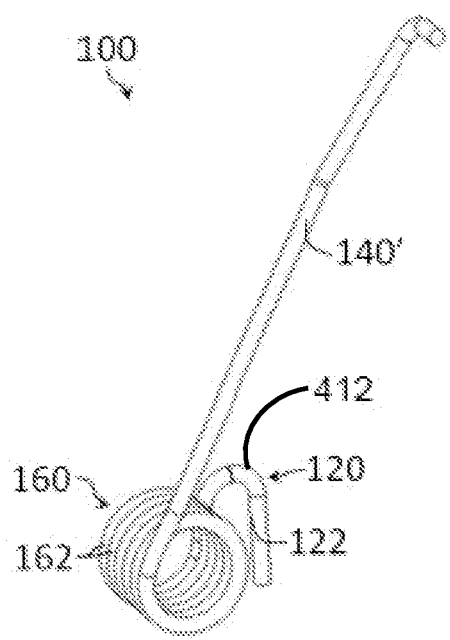
FIG. 4 shows a three-dimensional drawing of the torsion spring in a specific state in an exemplary embodiment of the present utility model.

As shown in FIG. 4, the spring coils 160 are formed of multiple adjacent individual coils 162. The spring coils shown in FIG. 4 are in a tightly coiled form, with gaps between adjacent individual coils thereof; the gaps are reduced in size by squeezing two end faces of the spring coils, and the axial length of the spring coils is shortened accordingly. In some embodiments, there are no gaps between adjacent individual coils thereof, and the axial length of the spring coils is also shortened by squeezing the two end faces of the spring coils. This is necessary for installing the torsion spring 100 in the recess 220 having the guide block 226; this is explained further below.

Figure 3:
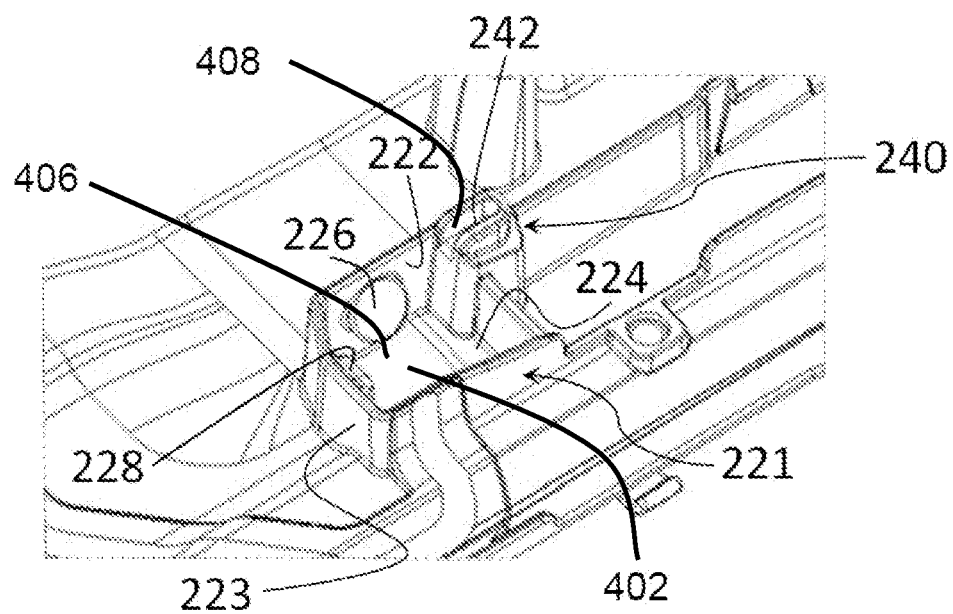
FIG. 3 shows a schematic drawing in which the torsion spring installation means for a vehicle sunroof is fitted in an exemplary embodiment of the present utility model.

As can further be seen from FIG. 3, the recess 220 is formed by the recess bottom 224 and the wall 221, wherein the recess bottom 224 is sunk inwards to form a cylindrical depressed face 402, so as to match an outer surface of the spring coils 160; the purpose of this design is to enable better contact with the outer surface of the spring coils 160, so as to reduce rebounding and wobbling of the spring coils 160. The wall 221 is formed of at least one wall face; because the structural features on the front frame 410 are complex and crowded together, the design of the wall 221 not only needs to enable convenient installation and removal, but also needs to be structurally compact so as not to affect the arrangement of other structures. In some embodiments, the cross section of the wall 221 can be configured to be quadrilateral, pentagonal, round, elliptical or irregularly shaped, etc., the aim being to facilitate installation and removal of the torsion spring, while space saving also needs to be taken into account. The height of each wall face can be configured to be different, but the height of each wall face should meet the requirement for prevention of water penetration as much as possible. In some embodiments, the height of the wall face is equal to or greater than the height at which the geometric centre or centre of gravity of the spring coils is located.

The cavity formed by the recess bottom 224 and wall 221 has an opening facing upwards; the opening allows the second torsion arm 140 to extend out and abut a wind-blocking mesh assembly 300 located thereabove, so as to apply an action force or reaction force to the wind-blocking mesh assembly 300. In addition, the opening makes the installation of the torsion spring simpler and more convenient, and without any superfluous structures, reduces the cost; these advantages are important.

In some embodiments, as a result of providing the guide block 226 extending out from the first wall face 222 in such a way that its size gradually diminishes, the spring coils can be guided, and the extent of wobbling and violent springing thereof can be limited. Here, the shape of the guide block can be configured as a transversely arranged cone, triangular pyramid, square pyramid or partial structure thereof. One such embodiment is described in detail below in conjunction with the drawings.

Figure 6:
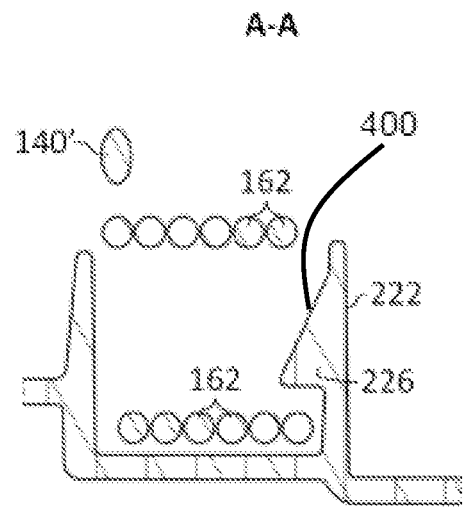
FIG. 6 shows a sectional view in direction A-A in FIG. 2.

Referring to FIGS. 3 and 6, the guide block 226 is arranged on the first wall face 222, which is perpendicular to the axial direction of the spring coils and close to the first torsion arm 120, and the guide block is substantially located in a middle position on the first wall face 222. It should be understood that the guide block 226 can also be arranged in a position on the first wall face 222 that is close to the recess bottom 224.

A free end of the guide block 226 extends towards the spring coils and has an inclined face downwards away from the opening; the shape of the inclined face is shown as being round or approximately round. As stated above, as a result of providing the inclined face, when the torsion spring 100 is installed in a designated position in the recess 224, that end of the spring coils 160 which is close to the first torsion arm 120 is squeezed by the inclined face, such that the axial length of the spring coils decreases temporarily, and the spring coils can be fitted over the guide block 226 in a downward direction along the inclined face and installed in the designated position in the recess. Once the squeezed spring coils have passed the position of maximum length of the guide block 226, the axial length of the spring coils can recover due to the disappearance of the squeezing force, and the torsion spring is then limited in the recess by the guide block 226 in a contactless fashion. Even in extreme road conditions, the torsion spring will be limited in the recess and will not spring violently or even jump out of the recess. It should be understood that without affecting installation and removal, the guide block 226 can also be arranged on a wall face that is close to the second torsion arm in the axial direction of the spring coils 160.

In some embodiments, the slope of the inclined face can be configured to be variable, i.e. it is possible for the inclined face to not be a flat surface, but instead be a sloping face formed of at least one curved surface. Designing the sloping face 400 as a flat surface or a curved surface has the same objective, namely to have the spring coils squeezed passively such that the squeezed spring coils slide downwards along the sloping face 400 into the recess and are limited in the recess. Such a design reduces the difficulty of installation, thus increasing the installation efficiency.

In some embodiments, the shape of the inclined face is round, elliptical, triangular or quadrilateral, etc.

In some embodiments, the absolute value of the slope of the inclined face is greater than or equal to one.

Figure 5:
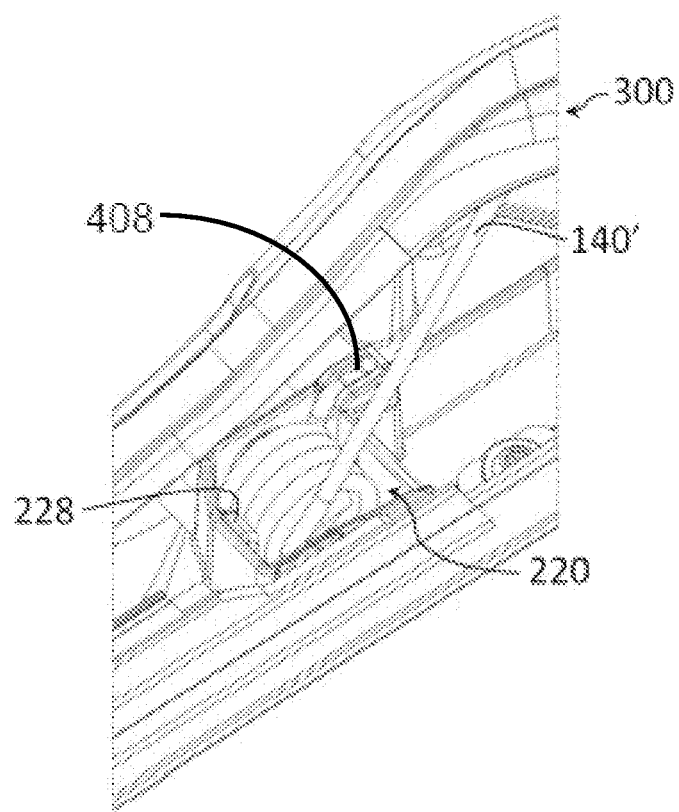
FIG. 5 shows a schematic drawing in which the torsion spring installation means for a vehicle sunroof, the torsion spring and part of the wind-blocking mesh assembly are fitted in an exemplary embodiment of the present utility model.

As stated above, referring to FIGS. 5 and 6, the structure of the torsion spring installation means needs to be compact so as to facilitate the overall arrangement of the front frame; therefore, the maximum length by which the guide block 226 extends out from the first wall face should be less than or equal to a length value when the spring coils 160 are installed with minimum axial length in the designated position in the recess 220, i.e. it is less than or equal to the length of the spring coils that can be installed and fitted in the designated position in the recess when squeezed to the limit. It should be understood that because the interior of the spring coils is hollow, oblique insertion of the spring coils into the recess requires a smaller axial space than horizontal insertion thereof into the recess, and the length value includes such a situation. If the maximum length exceeds the length value, then the spring coils will be unable to pass the position of the maximum length and thus unable to be fitted; moreover, if the maximum length is too short, then in extreme road conditions, the spring coils will not be able to be limited due to the existence of a reserved space between the recess and the spring coils in the axial direction of the spring coils, and so the guide block 226 will be unable to limit violent springing or jumping-out of the spring coils. The maximum length is related to the axial length of the spring coils in the natural state, the gap between adjacent individual coils, and the intrinsic attributes of the spring coils themselves; therefore, on this basis, in some embodiments the maximum length is set at two to four times the spring coil compression distance.

In some embodiments, the maximum length by which the guide block 226 extends out from the first wall face 222 is set at ⅙-¼ of the axial length of the spring coils in the natural state.

In some embodiments, when the torsion spring is a tightly coiled torsion spring, the maximum length by which the guide block extends out from the first wall face is 1.5 times the diameter of the individual coils. In some embodiments, the maximum length by which the guide block extends out from the first wall face is set between 3 mm and 4 mm.

Figure 7:
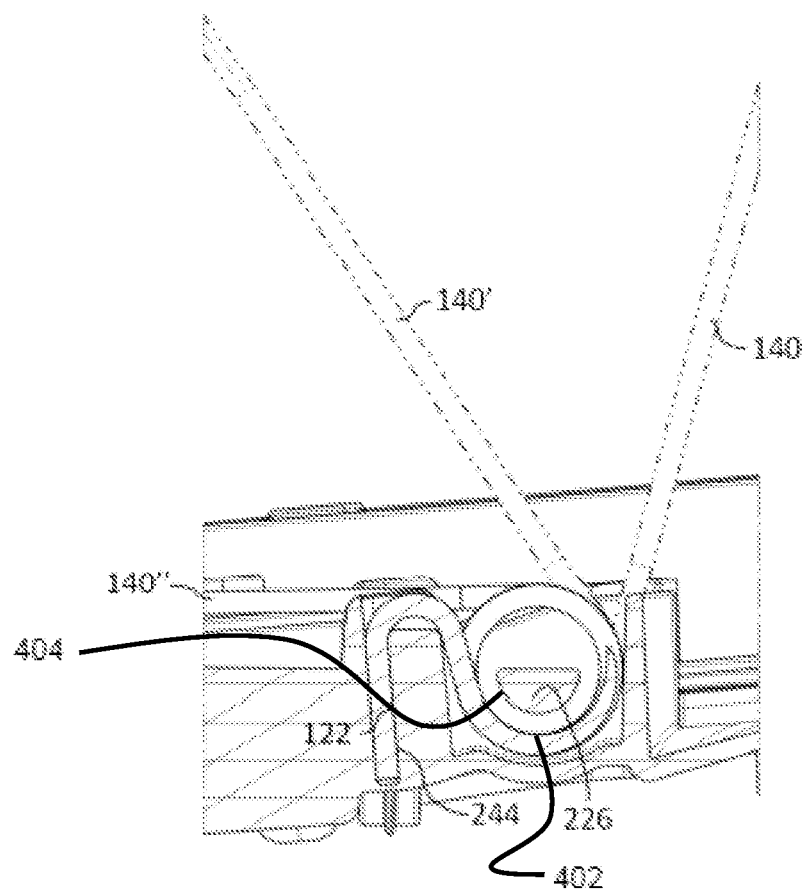
FIG. 7 shows a sectional view in direction B-B in FIG. 2.

Referring to FIGS. 6 and 7, when an inner surface of the spring coils is cylindrical, a bottom face 404 of the guide block is configured to have the shape of part of a cylinder, so as to match the inner surface of the spring coils. When the spring coils spring up, a portion of the reaction force acting on the spring coils in the opposite direction is offset due to the matching of the bottom face 404 of the guide block to the inner surface of the spring coils, such that reaction force sustained by the spring coils decreases, thus reducing wobbling of the spring coils and the extent of springing thereof. It should be understood that if the inner surface of the spring coils is not cylindrical, but instead has a shape similar to a cylinder or another shape, then the bottom face 404 of the guide block should be matched thereto, in order to reduce wobbling of the spring coils and the extent of springing thereof.

In some embodiments, the bottom face of the guide block can be configured to be matched to an inner surface of at least one individual coil of the spring coils, i.e. the bottom face of the guide block is configured to be matched to the screw-thread-like shape of the inner surface of at least one individual coil.

In some embodiments, the bottom face of the guide block can be configured as a flat surface or another shape.

It should be understood that the bottom face of the guide block is that face which is remote from the opening. In some embodiments, the guide block has multiple faces, in which case at least the bottom face of the guide block is matched to the shape of a portion of the inner surface of the spring coils; other faces, e.g. an outer peripheral face, can also be configured to be matched to the shape of a portion of the inner surface of the spring coils—this makes it easier to limit the spring coils.

Similar to the design of the bottom face of the guide block described above, the recess bottom 224 can be configured to comprise a depressed face that is likewise matched to the outer surface of the spring coils, as stated above. In some embodiments, the depressed face of the recess bottom 224 is configured to comprise a shape, similar to a screw-thread, which is matched to outer surfaces of all of the individual coils in contact with the recess bottom 224.

Referring to FIGS. 3, 5 and 7, the receiving component 240 comprises a blind hole with an opening part 242 facing upwards, and the first torsion arm 120 is inserted into the blind hole through the opening part 242. The diameter of the blind hole is matched to a corresponding position of the first torsion arm 120, being able to limit movement of the first torsion arm 120 in a horizontal direction. Configuring the opening part 242 of the blind hole to face upwards makes it possible to easily assist the fitting of the spring coils 160 over the guide block 226 and into the designated position in the recess when the torsion spring 100 is installed, in the case where the structure of the torsion spring installation means 200 is relatively compact. Furthermore, the fact that the opening part 242 of the blind hole faces upwards makes it possible to reduce the extent of spatial arrangement in a transverse direction, as well as preventing water penetration.

It should be understood that the receiving component 240 can also be configured to have another shape, instead of having a blind-hole structure. For example, it can be configured as a slot or a snap-fitting, etc.; the purpose of the configuration thereof must at least take into account convenience of installation and removal as well as the function of preventing water penetration.

In some embodiments, the receiving component 240 further comprises at least one first contact face 244 that limits a first horizontal direction, and/or at least one second contact face 408 that limits a first perpendicular direction. Correspondingly, in some embodiments, the first torsion arm 120 of the torsion spring comprises at least one first extension part 122 constrained in the first horizontal direction, and/or at least one second extension part 412 constrained in the first perpendicular direction. It should be understood that a constraining force in a second horizontal direction opposite to the first horizontal direction and a constraining force in a second perpendicular direction opposite to the first perpendicular direction produce torques on the first torsion arm 120 which are both used to balance a portion of a torque resulting from the action of the wind-blocking mesh assembly 300 on the second torsion arm 140' or 140".

Figure 8:
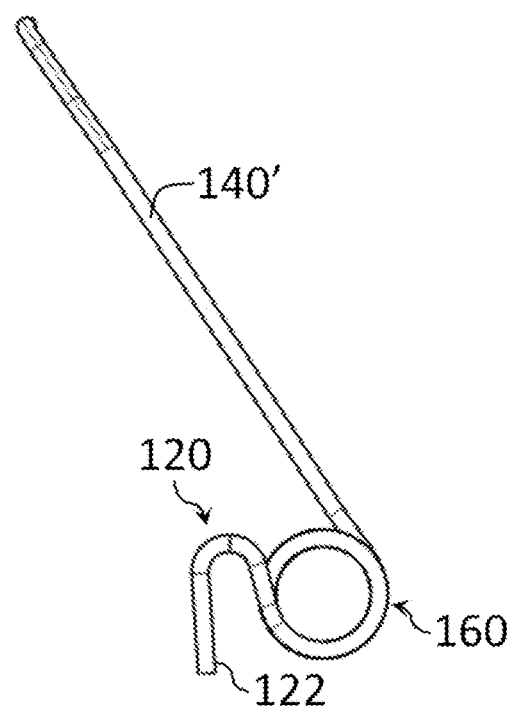
FIG. 8 shows a left view of the torsion spring in FIG. 4.
Figure 9:
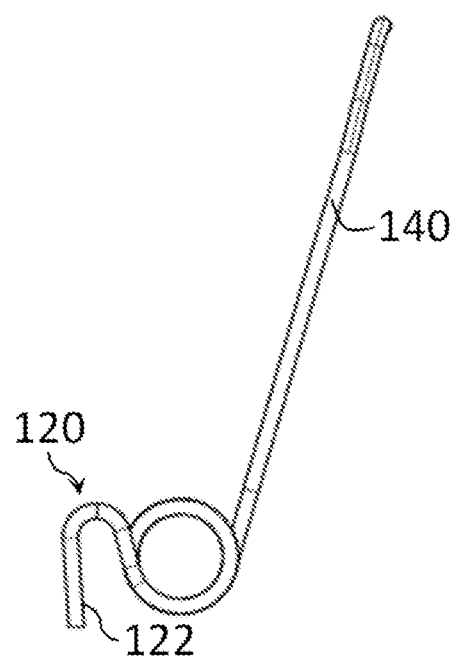
FIG. 9 shows a schematic drawing of the torsion spring in another specific state in an exemplary embodiment of the present utility model.

FIGS. 7-9 show demonstratively the first contact face 244 limiting the first horizontal direction and the first extension part 122 constrained in the first horizontal direction, second contact face 408 limiting the first perpendicular direction or second extension part 412 constrained in the first perpendicular direction. In some embodiments, the receiving component 240 is a horizontally arranged blind hole, in which case it has the second contact face 408 limiting the first perpendicular direction and the second extension part 412 constrained in the first perpendicular direction.

In some embodiments, the receiving component 240 comprises a cavity arranged in an oblique direction, e.g. a hole or slot arranged in an oblique direction. Arranging a hole or slot in an oblique direction for the purpose of receiving the first torsion arm 120 makes it possible to fulfil the objectives of easily assisting the installation and removal of the spring coils and preventing water penetration.

FIG. 1 shows the second torsion arm in three states; a detailed explanation is now given in conjunction with FIGS. 4, 8, 9 and 10.

State 1: the second torsion arm 140 when not acted on by an external force;

state 2: the second torsion arm 140' at a particular moment in time in the process of the wind-blocking mesh assembly 300 lifting up and opening or being pressed down and stowed;

state 3: the second torsion arm 140" after the wind-blocking mesh assembly 300 has been pressed down and stowed.

Figure 10:
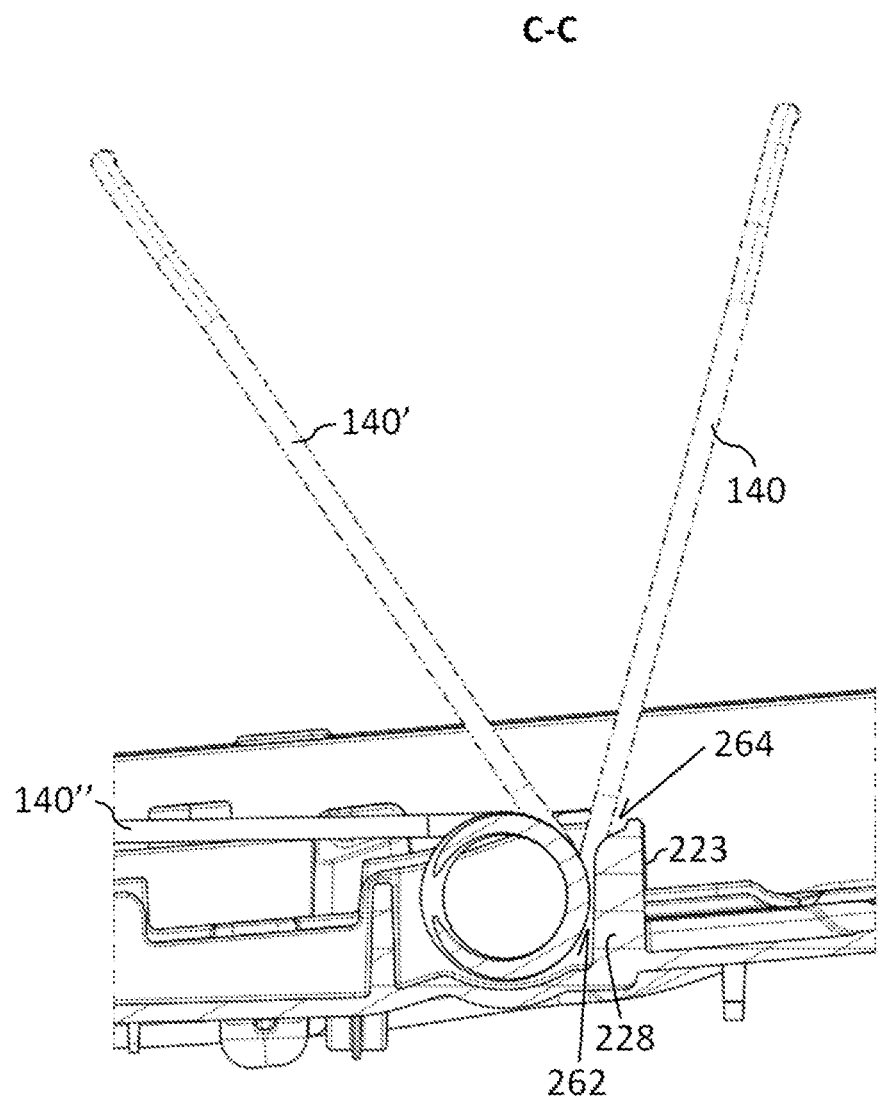
FIG. 10 shows a sectional view in direction C-C in FIG. 2.

FIG. 10 shows the second torsion arm 140 in the position of state 1; FIGS. 5 and 9 show the second torsion arm 140' in the position of state 2.

Referring to FIGS. 9 and 10, when the torsion spring 100 is installed in the torsion spring installation means 200, the second torsion arm 140 is not acted on by an external force and is thus in the position of state 1, in order to facilitate installation. At this time, an obtuse angle is formed between the second torsion arm 140 in the position of state 1 and the second torsion arm 140" in the position of state 3. The position of the second torsion arm 140 in state 1 affects the configuration of a second wall face 223. A detailed explanation is given below.

Figure 2:
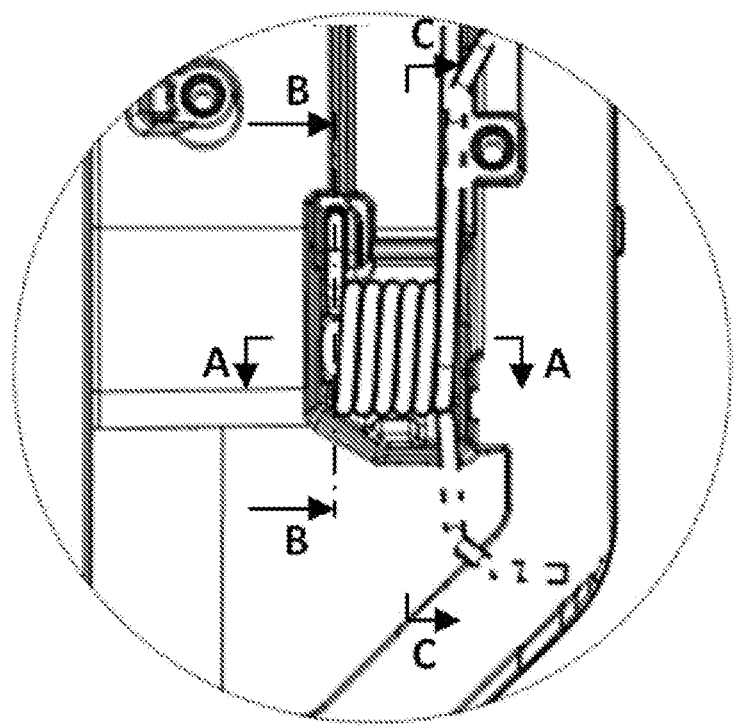
FIG. 2 shows a partial enlarged drawing in which the torsion spring installation means for a vehicle sunroof and the torsion spring are fitted in an exemplary embodiment of the present utility model.

Now referring to FIGS. 2 and 10, the recess 220 further comprises: a limiting block 228, the limiting block 228 being provided on the second wall face 223 in a fixed manner, for the purpose of limiting the extent of wobbling of the spring coils 160; and a first gap 262 is left between the limiting block 228 and the outer surface of the spring coils 160. In FIG. 3, part of the limiting block 228 is provided on the second wall face 223 in a fixed manner, offset with respect to the second torsion arm 140 and thus not affecting the installation of the torsion spring 100, with no interference therebetween. The first gap 262 can prevent abnormal sounds due to friction between the limiting block 228 and the spring coils 160, as well as avoiding wear to the spring coils 160 due to friction over a long period of time.

In some embodiments, the length of the first gap 262 is set at 1/6-1/5 of the diameter of an individual coil 162. In some embodiments, the length of the first gap 262 is set between 0.3 mm and 1.7 mm.

Due to the provision of the limiting block 228 to limit the extent of wobbling of the torsion spring 100, the distance between the second wall face 223 and the spring coils 160 can be conditionally increased, and it is thus possible to maintain the height of the second wall face 223, without sacrificing any height thereof, ultimately producing the effect of preventing water penetration; if the distance between the second wall face 223 and the spring coils 160 is too small and the height of the second wall face 223 is forcibly maintained, then when the torsion spring 100 is installed, the second torsion arm 140 in the position of state 1 will be pressed by an upper end of the second wall face 223, thus affecting installation. For this reason, the position of the limiting block 228 must avoid causing interference to the fitting of the second torsion arm 140. On this basis, in some embodiments, the limiting block 228 is provided on the second wall face 223 in a fixed manner in such a way as to be offset with respect to the second torsion arm 140. It should be understood that in some embodiments, the first torsion arm 120 and the limiting block 228 are on the same side of the spring coils 160, in which case the limiting block 228 is provided on the second wall face 223 in a fixed manner in such a way as to be offset with respect to the first torsion arm 120, with no interference therebetween.

In some embodiments, similar to the configuration of the bottom face of the guide block as described above, a free end of the limiting block, i.e. a part which extends out of the second wall face and is opposite the spring coils, can be configured to be likewise matched to the shape of the outer surface of the spring coils. In some embodiments, the free end of the limiting block is configured to comprise a screw-thread-like shape matched to the outer surface of at least one individual coil. In some embodiments, the limiting block has the same thickness or substantially the same thickness at each point where it extends out of the second wall face.

In some embodiments, there is no interference between the second wall face 223 and the second torsion arm 140 in the position of state 1. In some embodiments, a second gap 264 can be provided between the upper end of the second wall face 223 and the second torsion arm 140 in the position of state 1, in order to enable the second torsion arm 140 to be installed freely without being pressed by the upper end of the second wall face 223. If it were necessary to press the second torsion arm 140 in order to install the torsion spring due to assembly interference, this would increase the difficulty of torsion spring installation and hence lower the installation efficiency. Furthermore, due to the presence of the second gap 264, the height of the second wall face 223 is limited, but too low a height will result in water penetration. Hence, in some embodiments, the height of the second wall face 223 is set to be no lower than half of the maximum height of the spring coils 160 in the same direction, at the same time avoiding a situation where the height of the second wall face 223 is not enough to achieve the objective of limiting violent springing or wobbling of the spring coils.

In some embodiments, the height of the second wall face 223 is set to be no lower than the height of the geometric centre of the spring coils 160. In some embodiments, the height of the second wall face 223 is set to be no lower than the height of the centre of gravity of the spring coils 160. Such a configuration enables the torsion spring to be stabilized as quickly as possible.

In some embodiments, the guide block and/or limiting block is/are provided on the torsion spring installation means in a fixed manner, or integrally formed with the torsion spring installation means by injection moulding.

In some embodiments, the torsion spring installation means is provided on the front frame in a fixed manner, or integrally formed on the front frame.

The comprehensive, simple and effective configuration above furnishes the torsion spring installation means with numerous advantages, such as convenience of installation and removal, ease of maintenance and replacement, a rational and simple structure, effective prevention of water penetration, the ability to prevent the torsion spring from springing to a high degree, jumping out and wobbling, an extended torsion spring service life, and a low cost.

The various embodiments presented above are merely exemplary, and do not imply any limitation of the scope of the present utility model. The innovations described in the present utility model and various variants thereof fall within the predicted scope of the present utility model. Furthermore, the subject matter described in the present utility model and the claims is intended to cover and include all appropriate technical variants.

The invention claimed is:

1. A torsion spring installation means for a vehicle sunroof, configured to have a torsion spring fixed therein, the torsion spring comprising:
    spring coils,
    a first torsion arm and a second torsion arm,
    wherein the torsion spring installation means comprises:
        a recess, the recess being configured as a cavity having an opening, for the purpose of receiving the spring coils, and having a wall and a recess bottom;
        wherein the recess further comprises: a limiting block, the limiting block being provided on a second wall face in a fixed manner, and a first gap being left between the limiting block and an outer surface of the spring coils, for the purpose of limiting the extent of wobbling of the spring coils, and wherein the limiting block avoids the first torsion arm and/or the second torsion arm;
        a receiving component, the receiving component having an opening part, in order to receive the first torsion arm;
        wherein a guide block is provided on a first wall face of the wall in a fixed manner, the guide block extending out from the first wall face in such a way that its size gradually diminishes.

2. The torsion spring installation means according to claim 1, wherein a free end of the guide block forms a sloping face in a direction away from the opening.

3. The torsion spring installation means according to claim 1, wherein the recess bottom comprises: a depressed face matched to the shape of an outer surface of the spring coils.

4. The torsion spring installation means according to claim 1, wherein the maximum length by which the guide block extends out from the first wall face is set at two to four times a spring coil compression distance of the spring coils.

5. The torsion spring installation means according to claim 1, wherein at least a bottom face of the guide block is configured to have a shape matched to a partial inner surface of the spring coils.

6. The torsion spring installation means according to claim 1, wherein the second wall face is configured so as not to interfere with the second arm when the second arm is in a position in which it is located when not acted on by an external force.

7. The torsion spring installation means according to claim 6, wherein the height of the second wall face is configured to be no lower than the height of the geometric centre or centre of gravity of the spring coils.

8. The torsion spring installation means according to claim 1, wherein the receiving component further comprises: a cavity arranged in an oblique direction, the cavity receiving the first torsion arm via the opening part.

9. The torsion spring installation means according to claim 1, wherein the receiving component further comprises: at least one first contact face that limits a first horizontal direction, and/or at least one second contact face that limits a first perpendicular direction.

10. A front frame for a vehicle sunroof, wherein the front frame comprises the torsion spring installation means for a vehicle sunroof according to claim 1.

11. The front frame according to claim 10, wherein the torsion spring installation means for a vehicle sunroof is provided on the front frame in a fixed manner or is integrally formed on the front frame.

12. A vehicle sunroof, wherein the vehicle sunroof comprises:
a torsion spring, a wind-blocking mesh assembly; and
the torsion spring installation means for a vehicle sunroof according to claim 1;
the torsion spring being fixed and connected to the wind-blocking mesh assembly via the torsion spring installation means, for the purpose of providing an action force or a reaction force for the wind-blocking mesh assembly.

13. The vehicle sunroof according to claim 12, wherein the first torsion arm comprises: at least one first extension part constrained in a first horizontal direction, and/or at least one second extension part constrained in a first perpendicular direction.

14. A vehicle sunroof, wherein the vehicle sunroof comprises:
a torsion spring, a wind-blocking mesh assembly; and
the front frame for a vehicle sunroof according to claim 10;
the torsion spring being fixed and connected to the wind-blocking mesh assembly via the torsion spring installation means, for the purpose of providing an action force or a reaction force for the wind-blocking mesh assembly.

* * * * *